United States Patent [19]

Kildahl et al.

[11] 4,128,502

[45] Dec. 5, 1978

[54] ETHYLENE POLYMERIZATION CATALYST

[75] Inventors: Nicholas K. Kildahl, Worcester, Mass.; Peter Fotis, Highland, Ind.

[73] Assignee: Standard Oil Company (Indiana), Chicago, Ill.

[21] Appl. No.: 856,862

[22] Filed: Dec. 2, 1977

Related U.S. Application Data

[63] Continuation-in-part of Ser. No. 755,862, Dec. 30, 1976, abandoned.

[51] Int. Cl.$^2$ .................... C08F 4/10; C08F 4/64
[52] U.S. Cl. .................... 252/431 R; 252/429 C; 252/430; 526/124
[58] Field of Search ............ 252/429 C, 431 R, 430

[56] References Cited

U.S. PATENT DOCUMENTS

| 3,644,318 | 2/1972 | Diedrich et al. | 252/431 R X |
| 3,654,249 | 4/1972 | Diedrich et al. | 252/429 C X |
| 3,819,599 | 6/1974 | Fotis et al. | 252/429 C X |
| 3,951,935 | 4/1976 | Engelmann | 252/429 C X |

Primary Examiner—Patrick Garvin
Attorney, Agent, or Firm—Stephen L. Hensley; Arthur G. Gilkes; William T. McClain

[57] ABSTRACT

Polyethylene or ethylene copolymer containing up to about twenty percent of a $C_3$ to $C_8$ olefin can be made by using a solid catalyst component prepared from (1) a lower alkyl magnesium alkoxide or magnesium hydroxide, (2) a titanium-aluminum compound, and (3) a lower alkyl alkylaluminum dichloride. Said solid component can be used in conjunction with a trialkylaluminum promoter in a slurry or vapor phase polymerization process at moderate polymerization temperatures and pressures.

10 Claims, No Drawings

ETHYLENE POLYMERIZATION CATALYST

This is a continuation-in-part of application Ser. No. 755,862, filed Dec. 30, 1976, now abandoned.

SUMMARY OF THE INVENTION

This invention relates to a novel, high yield catalyst combination for producing polyethylene or ethylene copolymer, which catalyst combination comprises a solid, supported, titanium-containing catalyst component and a trialkylaluminum promoter, and more particularly, it relates to a novel, high yield catalyst combination for making polyethylene or ethylene copolymer, which combination comprises (a) a solid catalyst component prepared from (1) a lower alkyl magnesium alkoxide or magnesium hydroxide, (2) a titanium-aluminum compound, and (3) a lower alkyl alkylaluminum dichloride and (b) a trialkylaluminum promoter.

In accordance with the instant invention, polyethylene or ethylene copolymer containing up to about twenty mol percent of a $C_3$ to $C_8$ polymerizable olefin can be made using a novel, high yield catalyst combination comprising (a) a solid catalyst component prepared from (1) a lower alkyl magnesium dialkoxide or magnesium hydroxide, (2) a titanium-aluminum compound which is a liquid reaction product of aluminum chloride and a lower alkyl titanium (IV) alkoxide, and (3) an alkylaluminum dichloride and (b) a lower alkyl trialkylaluminum promoter.

BACKGROUND OF THE INVENTION

Recently, highly-active supported transition metal compound catalyst combinations based upon the use of magnesium compounds have become available for the commercial production of polyethylene. For example, U.S. Pat. No. 3,901,863 to Solvay and Cie teaches polymerization of ethylene and its mixtures with, for example, an alkylaluminum compound promoter and a solid catalyst component made from a non-halide containing magnesium alkoxide, a non-halide containing titanium alkoxide and an alkylaluminum halide. Also, U.S. Pat. No. 3,644,318 teaches reaction of selected $TiX_n(OR)_{4-n}$ compounds, where $n$ is 1 to 4, X is Cl or Br, and R is an alkyl group, with $Mg(OH)_2$ to form a co-catalyst to be used with certain organometallic compounds including aluminum alkyls as promoters for the polymerization of ethylene or its mixtures. Further, U.S. Pat. No. 3,900,454 teaches treatment of certain inorganic compounds including magnesium hydroxide with, for example, $AlCl_3$, and thereafter, treatment with certain transition metal compounds including Ti (IV) alkoxides and chloroalkoxides to form a co-catalyst which is then promoted with certain organometallic compounds including aluminum alkyls for use in suspension polymerization of alpha-olefins including ethylene. However, these catalysts are either of lower than desirable polymer yields, or when highly active, in the sense of producing sufficiently high polymer yields so that no separation of catalyst residues need be carried out in finishing the polymer, the polymer molecular weight distribution is relatively narrow.

Now, new catalyst combinations have been found which can have the high activities of the best of new generation supported and promoted transition metal catalysts and can produce polyethylenes having a reasonable range of molecular weight distributions as represented by $MF_{10}/MF_1$ values.

STATEMENT OF THE INVENTION

The solid catalyst component of the instant catalyst combinations is of the supported, transition-metal-containing variety and is made from at least three materials. The first material is a magnesium alkoxide or magnesium hydroxide. Preferably, any lower alkyl magnesium alkoxide or magnesium hydroxide can be employed. More preferably, a magnesium dialkoxide containing alkyl radicals each having from one to about six carbon atoms is used, and, most preferably, magnesium diethoxide is the first material.

The second material is preferably a titanium-aluminum compound which is the liquid reaction product of a titanium (IV) alkoxide or a chloroalkoxide and aluminum chloride. More preferably, it is a liquid titanium-aluminum compound which is the reaction product of aluminum chloride and a titanium (IV) alkoxide containing alkoxide groups containing between one and about six carbon atoms and, most preferably, the titanium-aluminum compound is the liquid reaction product of aluminum chloride and titanium (IV) tetrabutoxide. By liquid titanium-aluminum compound is meant a compound liquid in the range of about 15° C. to about 40° C.

The third material is preferably any alkylaluminum dichloride. More preferably, the third material is a lower alkyl alkylaluminum dichloride in which the alkyl group contains from one to about six carbon atoms. Most preferably, the third material is ethylaluminum dichloride.

It is often preferable to treat the solid reaction product of the above three materials with hydrogen chloride in the manner set forth in U.S. Patent Application Ser. No. 631,956 (Hoff and Fotis), now abandoned, or U.S. Patent Application Ser. No. 631,954 (Hoff), now U.S. Pat. No. 4,039,472, in order (1) to increase polymer particle size, (2) reversibly and substantially reduce catalyst activity, (3) increase polymer molecular weight distribution, etc.

Two modes of preparation of the solid catalyst component give good results in producing a solid catalyst component having a high polymerization yield when used with a promoter. The first is to react, preferably in the presence of an inert diluent, the magnesium compound and the titanium-aluminum compound, and combine the product thereof with the alkylaluminum dichloride. The second is to react the magnesium compound, and the alkylaluminum dichloride, preferably in the presence of an inert diluent, and then react the resultant product with the titanium-aluminum compound. The solid catalyst prepared according to either of these methods can optionally be treated with hydrogen chloride.

In preparing the solid catalysts of this invention, the magnesium alkoxide or magnesium hydroxide and titanium-aluminum compound are employed in amounts such that the molar ratio of elemental magnesium to elemental titanium ranges from about 0.5 to about 5, and preferably, from about 1 to about 3. The amount of the alkylaluminum dichloride used in the catalyst component preparation is about one to about tens mols of alkylaluminum compound per mol of magnesium compound used. More preferably, this latter ratio varies between about one to about five mols of alkylaluminum dichloride per mol of magnesium compound used.

In respect of the liquid titanium-aluminum compound, it is made by reacting preferably one-third to about two mols of aluminum chloride per mol of titanium (IV) alkoxide used and, more preferably, about one-half to about one and seven-tenths mols of aluminum chloride per mol of titanium (IV) alkoxide used. More preferably, this latter mol ratio is employed in an amount between about one-half to one and about one to one. These components are reacted, preferably in an inert diluent, at temperatures ranging from about 0° to about 150° C., and preferably from about 0° to about 65° C.

The titanium-aluminum compound is reacted with the magnesium compound, or alternatively, with the reaction product of the magnesium compound and the alkylaluminum dichloride at temperatures ranging from about 0° to about 150° C., and preferably from about 0° to about 65° C. Preparative steps involving reaction of the alkylaluminum dichloride component with the magnesium compound or the mixture thereof with the titanium-aluminum compound are carried out at temperatures ranging from about −20° to about 150° C., and preferably from about 0° to about 65° C.

It is generally efficacious and preferred to carry out each reaction step in the presence of an inert, liquid diluent. However, where the liquid titanium-aluminum compound is reacted in a separate step such compound can be used neat. By inert liquid diluent is meant a diluent which at least partially dissolves one or more reactants and is substantially unreactive with the reactants and products at the reaction temperature used. Hydrocarbons, aromatic or aliphatic, such as benzene or heptane and their halo derivatives are excellent for this purpose if they can be conveniently handled at the reaction temperature. Aliphatic hydrocarbons such as a hexane, an octane or a decane, etc. are preferred. It is important, for best results, that the inert liquid diluent chosen is purified prior to use from traces of moisture, oxygen, etc. and traces of polar organic substances by, for example, percolating the diluent through silica gel or molecular sieves.

Preferably, each reaction step is allowed to continue about thirty minutes to about 48 hours and, more preferably, about 2 hours to about 24 hours.

The amount of titanium combined as a compound in the support is relatively small being generally in the range of from about one-tenth to about fifteen weight percent, calculated as the metal, of the total weight of solid catalyst component. More preferably, it is between about one-half to about ten weight percent. Other things being equal, the more the titanium combined with the support material, the more active the supported catalyst becomes. Too much, however, can be wasteful of the titanium-aluminum compound reactant and also can lead to decreased yields.

If it is desired to treat the above described solid catalysts with hydrogen chloride, the amount of hydrogen chloride employed depends upon the purpose for which it is employed and is as set forth in the two U.S. Patent Applications, supra, which are herein specifically incorporated by reference.

Use of the new catalyst component for the polymerization of olefins is accompanied for best results by employment of a promoter which is preferably a trialkylaluminum. More preferably, it is a lower alkyl trialkylaluminum such as triethylaluminum or triisobutylaluminum, the former being most preferred. By lower alkyl is meant an alkyl group containing between one and about six carbon atoms.

In general, the promoter is employed in an amount which is effective to increase catalyst activity. For particle form polymerization, the total amount of trialkylaluminum promoter used depends upon whether the promoter is mixed with the polymerization diluent, if used, as well as the solid catalyst component. For preferable results employing a process using a polymerization diluent, the ratio of total millimols of promoter used to grams of solid catalyst component should be at least about two to one. More preferably, it ranges from about two to one to about 100 to one. Most preferably, from about ten to about 25 millimols of promoter are employed for each gram of solid catalyst component. The ratio of promoter to solid catalyst component concentrations depends upon polymerization temperature somewhat, increasing as polymerization temperature decreases, and also upon diluent purity and the amount of diluent used. For vapor phase polymerization the amount of trialkylaluminum required is substantially less.

The solid catalyst component of this invention can be used in the particle form variation in the temperature range from above about ambient to about 130° C. The catalyst component can be used also in an essentially diluent-free process wherein, for example, the olefin is polymerized directly from the vapor phase. The polymerization temperature using the essentially diluent-free process should be large enough to give an adequate polymerization rate but not too large to raise the pressure above that which is normally used in this type of process, i.e., several hundred p.s.i.g., or soften the particulate polymer contained in the reactor.

In the particle-form process, the polymerization is carried out at a temperature such that the polymer as formed is a solid in the polymerization reactor. The preferred polymerization temperature is about 40° C. to about 110° C. In vapor phase polymerizations wherein the catalyst component, promoter, monomer and quench liquid, if used, are important components, the preferable temperature range is from about 0° C. to about 130° C. and, more preferably, about 20° C. to about 120° C.

Whereas the olefin preferred for use with catalyst combination is ethylene, it has been found that the solid catalyst component is also useful for making ethylene copolymers containing up to about twenty mol percent of a $C_3$ to $C_8$ olefin like propene, a butene, a pentene, etc. or polymerizable diolefin such as butadiene, isoprene, etc.

It is of particular importance for best results that the olefin, for example ethylene, be substantially free of catalyst poisons. Thus, it is preferred to use polymerization grade ethylene and to pass it through a molecular sieve prior to use to remove the remaining traces of moisture, oxygen, carbon dioxide and polar organic compounds.

The polymerization diluent employed in a particle form process can be an aliphatic alkane or cycloalkane such as isobutane, pentane, hexane, heptane or cyclohexane or a hydrogenated aromatic compound such as tetrahydronaphthalene or decahydronaphthalene or a high molecular weight liquid paraffin or mixture of paraffins which are liquid at the reaction temperature. The nature of the diluent is subject to considerable variation, although the diluent employed should be liquid under the conditions of polymerization and relatively inert.

The polymerization diluent, when employed in practicing this invention, should be purified, for best results, from traces of moisture, oxygen, carbon dioxide and polar organic compounds prior to use in the polymerization reaction by contacting the diluent for example, in a distillation procedure or otherwise, with an organoaluminum compound prior to or after percolating the diluent through silica gel or molecular sieves.

The polymerization time is not critical and will usually be of the order of thirty minutes to several hours in batch processes. Contact times of from one to several hours are commonly employed in autoclave type reactions. When a continuous process is employed, the contact time in the polymerization zone can also be regulated as desired, and generally, it is not necessary to employ reaction or contact times much beyond one-half to several hours since a cyclic system can be employed by removal of the polymer and return of the diluent, it used, and unreacted monomer, etc. to the charging zone where the catalyst can be replenished and additional monomer introduced.

The polymerization catalyst of this invention is normally used with an additive to control molecular weight such as hydrogen. Solid polymers having molecular weights greater than about 50,000 and less than about 2,000,000 result thereby. The amount of hydrogen to be used depends upon the molecular weight distribution to be obtained and is well known to those skilled in the art.

The polyolefins prepared in accordance with this invention can be extruded, mechanically melted, cast or molded as desired. They can be used to form plates, sheets, films or a variety of molded objects.

Usefully, the pressure range for the polymerization process using the solid catalyst component of this invention is about atmospheric to over 1000 p.s.i.g. More preferably, the pressure range varies from about 100 p.s.i.g. to about 800 p.s.i.g. and, most preferably, the pressure range used in the instant process is about 200 p.s.i.g. to about 600 p.s.i.g.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

The magnesium ethoxide used was a commercial product from Alfa Products. The aluminum alkyl was purchased from Texas Alkyls. The titanium tetrabutoxide was purchased from Stauffer Chemical Company.

EXAMPLE I

A 1.33 gram (0.01 mol) amount of aluminum chloride, 3.4 milliliters (0.01 mol) of titanium tetrabutoxide and ten milliliters of nonane were mixed in a three-necked, round-bottomed flask which resulted in an orange-brown solution. This solution was mixed for 30 minutes and then allowed to cool to room temperature. An 85 milliliter amount of hexane was then added followed by 1.45 grams (0.025 mol) of magnesium hydroxide. The result was brought to reflux and maintained there for one hour, then allowed to cool to ambient temperature and stirred gently for 60 hours. A 13.01 milliliter amount of a 50% by weight solution of ethylaluminum dichloride in hexane was then added over a one-half hour period. The result was allowed to stir overnight and a six milliliter portion of the slurry was diluted with 47.8 milliliters of hexane to form a stock solution for polymerization. The remainder of the slurry was saved and used in Example II.

EXAMPLE II

This catalyst component was prepared by adding 8.24 milliliters of a 50% by weight solution of ethylaluminum dichloride in hexane to the remainder of the undiluted portion of catalyst component from Example I. The result was stirred overnight. A six milliliter portion of the resulting slurry was diluted with 43.8 milliliters of hexane to form a stock solution for polymerization.

EXAMPLE III

A 4.43 gram (0.033 mol) amount of aluminum chloride, 6.8 milliliters (0.02 mol) of titanium tetrabutoxide and 10 milliliters of nonane were mixed and stirred in a three-necked, round-bottomed flask to give an orange-brown solution. This solution was heated to reflux and thereafter cooled to ambient temperature. A 50 milliliter amount of hexane was added followed by a 2.92 gram (0.05 mol) amount of magnesium hydroxide. The resulting mixture was stirred overnight at ambient temperature. Thereafter a 62.7 milliliter amount of a 50% by weight solution of ethylaluminum dichloride in hexane was added over a two hour period and the resulting slurry stirred overnight. A three milliliter portion of the slurry was diluted with 43.4 milliliters of hexane to form a stock solution for polymerization.

EXAMPLE IV

A 1.33 gram (0.01 mol) amount of aluminum chloride and 3.4 milliliters (0.01 mol) amount of titanium tetrabutoxide were mixed in a three-necked, round-bottom flask to give an orange-brown solution. A 50 milliliter amount of hexane was added and the solution stirred for 30 minutes. A 2.85 gram (0.025 mol) amount of magnesium diethoxide was then added and the result stirred for an additional 30 minutes. A 37.1 milliliter amount of a 50% by weight solution of ethylaluminum dichloride in hexane was added over a two hour period and the resulting slurry stirred overnight. A two milliliter amount of this slurry was diluted with 46.5 milliliters of hexane to form a stock solution for polymerization.

EXAMPLE V

A 2.85 gram amount (0.025 mol) amount of magnesium diethoxide was slurried with 10 milliliters of hexane and treated with 37.1 milliliters of a 50% by weight solution of ethylaluminum dichloride in hexane. The resulting mixture was stirred overnight. In a separate container a 1.33 gram (0.01 mol) amount of aluminum chloride and a 3.4 milliliter (0.01 mol) amount of titanium tetrabutoxide were mixed to give an orange-brown solution. This solution was diluted with 40 milliliters of hexane and added dropwise over a 45 l minute period to the mixture of ethylaluminum dichloride and magnesium diethoxide. The result was stirred overnight and 2 milliliters of the resultant slurry was diluted with 46.5 milliliters of hexane to give a stock solution for polymerization.

EXAMPLE VI

This Example shows the results obtained in ethylene polymerizations using catalyst components prepared following Examples I–V and varying amounts of triethylaluminum as the promoter. The polymerizations were carried out using a 500 milliliter, stainless steel autoclave containing 250 milliliters of hexane as a diluent.

The polymerizations were allowed to run for 1 hour at 87° C. and a total pressure (hydrogen and ethylene) of 300 p.s.i.g. Melt indices were run using ASTM-D1238 65T, condition E and ASTM-D123865T, condition F to give $MF_1$ and $MF_{10}$ values respectively. The results are shown below in the Table:

TABLE

| Ex. | Catalyst Slurry Amount (ml.) | Amount Promoter (mg.) | Hydrogen Pressure (psig.) | Polymer Yield (g.) | MI (g./10 mins.) | $MF_{10}/MF_1$ | $AlCl_3/Ti(OBu)_4$ (mol ratio) |
|---|---|---|---|---|---|---|---|
| I | 3 | 100 | 100 | 27.5 | 0.26 | 57.7 | 1/1 |
| I | 3 | 120 | 120 | 27.1 | 0.21 | 57.1 | 1/1 |
| II | 3 | 120 | 120 | 29.4 | 0.57 | 51.9 | 1/1 |
| II | 3 | 120 | 100 | 38.9 | 0.33 | 54.5 | 1/1 |
| II | 3 | 120 | 110 | 30.6 | 0.57 | 49.8 | 1/1 |
| III | 2 | 120 | 100 | 28.1 | 0.44 | 42.3 | 1.7/1 |
| III | 2 | 120 | 120 | 15.2 | 0.49 | 57.6 | 1.7/1 |
| III | 2 | 120 | 130 | 9.1 | 0.58 | 54.8 | 1.7/1 |
| IV | 2 | 60 | 100 | 71.4 | 1.2 | 38.8 | 1/1 |
| IV | 1 | 60 | 110 | 27.9 | 2.4 | 33.5 | 1/1 |
| IV | 1 | 60 | 120 | 50 | 4.7 | 37.1 | 1/1 |
| IV | 1 | 80 | 100 | 53.2 | 1.2 | 35.6 | 1/1 |
| IV | 1 | 80 | 110 | 37 | 2.2 | 34.4 | 1/1 |
| IV | 1 | 80 | 120 | 41 | 3.1 | 34.1 | 1/1 |
| V | 1 | 60 | 80 | 41 | .54 | 37.6 | 1/1 |
| V | 1 | 60 | 100 | 30.1 | 1.6 | 34.4 | 1/1 |
| V | 1 | 60 | 110 | 34.5 | 1.7 | 35.2 | 1/1 |
| V | 1 | 80 | 80 | 34 | 0.72 | 34.6 | 1/1 |
| V | 1 | 80 | 100 | 29.5 | 1.7 | 36.3 | 1/1 |
| V | 1 | 80 | 110 | 29.8 | 2.4 | 33.2 | 1/1 |
| V | 1 | 100 | 80 | 65.9 | 0.34 | 38.2 | 1/1 |
| V | 1 | 100 | 100 | 23.8 | 1.3 | 37.3 | 1/1 |
| V | 1 | 100 | 110 | 25.8 | 1.8 | 33.3 | 1/1 |

What is claimed is:

1. A catalyst for polymerizing ethylene or ethylene containing a small amount of polymerizable $C_3$ to $C_8$ olefin comprising:

(a) a solid catalyst component made from (1) a lower alkyl magnesium alkoxide or magnesium hydroxide, (2) a liquid titanium-aluminum compound which is the reaction product of aluminum chloride and a lower alkyl titanium (IV) alkoxide reacted at a temperature ranging from about 0° to about 150° C. in a mol ratio, said aluminum chloride to said alkoxide, between one-third to one and about two to one, and (3) a lower alkyl alkylaluminum dichloride, wherein (1) and (2) are reacted at a temperature ranging from about 0° to about 150° C. in amounts such that the molar ratio of elemental magnesium to elemental titanium ranges from about 0.5 to about 5, and wherein the product of the reaction of (1) and (2) is reacted with (3) at a temperature ranging from about −20° to about 150° C., the concentration of (3) ranging from about 1 to about 10 mols per mol of (1) employed; and (b) a lower alkyl trialkylaluminum promoter in an amount which is effective to increase the activity of (a).

2. The catalyst of claim 1 wherein the amount of promoter ranges from about 2 to about 100 millimols per gram of (a).

3. The catalyst of claim 2 wherein said magnesium alkoxide or magnesium hydroxide is a magnesium dialkoxide and said titanium (IV) alkoxide is a titanium (IV) tetraalkoxide.

4. The catalyst of claim 3 wherein said magnesium dialkoxide is magnesium diethoxide, said titanium (IV) tetraalkoxide is titanium tetrabutoxide, and said alkylaluminum dichloride is ethylaluminum dichloride.

5. The catalyst of claim 4 wherein said promoter is triethylaluminum.

6. A catalyst for polymerizing ethylene or ethylene containing a small amount of polymerizable $C_3$ to $C_8$ olefin comprising:

(a) a solid catalyst component made from (1) a lower alkyl magnesium alkoxide or magnesium hydroxide, (2) a liquid titanium-aluminum compound which is the reaction product of aluminum chloride and a lower alkyl titanium (IV) alkoxide reacted at a temperature ranging from about 0° to about 150° C. in a mol ratio, said aluminum chloride to said alkoxide, between one-third to one and about two to one, and (3) a lower alkyl alkylaluminum dichloride, wherein (1) and (3) are reacted at a temperature ranging from about −20° to about 150° C. in amounts such that the molar ratio of (3) to (1) ranges from about 1 to about 10, and wherein the product of the reaction of (1) and (3) is reacted with (2) at a temperature ranging from about 0° to about 150° C. in amounts such that the molar ratio of elemental magnesium to elemental titanium ranges from about 0.5 to about 5; and (b) a lower alkyl trialkylaluminum promoter in any amount which is effective to increase the activity of (a).

7. The catalyst of claim 6 wherein the amount of the promoter ranges from about 2 to about 100 millimols per gram of (a).

8. The catalyst of claim 7 wherein said magnesium alkoxide or magnesium hydroxide is a magnesium dialkoxide and said titanium (IV) alkoxide is a titanium (IV) tetraalkoxide.

9. The catalyst of claim 8 wherein said magnesium dialkoxide is magnesium diethoxide, said titanium (IV) tetraalkoxide is titanium tetrabutoxide, and said alkylaluminum dichloride is ethylaluminum dichloride.

10. The catalyst of claim 9 wherein said promoter is triethylaluminum.

* * * * *

UNITED STATES PATENT OFFICE
CERTIFICATE OF CORRECTION

Patent No. 4,128,502  Dated December 5, 1978

Inventor(s) Nicholas K. Kildahl and Peter Fotis

It is certified that error appears in the above-identified patent and that said Letters Patent are hereby corrected as shown below:

| Patent Column | Line | | |
|---|---|---|---|
| 2 | 61 | "tens mols" should be | --ten mols-- |
| 5 | 15-16 | "it used" should be | --if used-- |
| 6 | 55 | "45 1 minute" should be | --45 minute-- |
| 7 | 10 | "(mol ratio" should be | --(mol ratio)-- |

Signed and Sealed this

Eighth Day of May 1979

[SEAL]

Attest:

RUTH C. MASON
Attesting Officer

DONALD W. BANNER
Commissioner of Patents and Trademarks